United States Patent [19]

Araki et al.

[11] Patent Number: 4,948,833
[45] Date of Patent: Aug. 14, 1990

[54] OLEFINIC RESIN COMPOSITION AND MOLDED ARTICLE

[75] Inventors: Tatsuo Araki, Osaka; Keisuke Okushiro, Kyoto, both of Japan

[73] Assignee: Hitachi Maxell, Ltd., Osaka, Japan

[21] Appl. No.: 352,893

[22] Filed: May 17, 1989

[30] Foreign Application Priority Data

May 18, 1988 [JP] Japan .................................. 63-122669
Oct. 22, 1988 [JP] Japan .................................. 63-266975

[51] Int. Cl.$^5$ ...................... C08L 23/06; C08L 67/00; C08L 33/04
[52] U.S. Cl. ..................................... 524/508; 524/513; 524/502; 524/508; 524/523; 524/496
[58] Field of Search ............... 524/431, 413, 502, 508, 524/513, 523

[56] References Cited

U.S. PATENT DOCUMENTS 4,477,608 10/1984 Bäbler et al. ........................ 523/215
4,563,495 1/1986 Kawaguchi et al. ............... 524/413
4,628,074 12/1986 Boutni ................................ 525/146

FOREIGN PATENT DOCUMENTS 1233045 of 1985 Japan .

Primary Examiner—Joseph L. Schofer
Assistant Examiner—John J. Guarriello
Attorney, Agent, or Firm—Birch, Stewart, Kolasch & Birch

[57] ABSTRACT

An olefinic resin composition for molding, which comprises an olefinic resin, inorganic particles in rod shape and inorganic particles of planar crystalline structure respectively in 10 to 90% by volume, 3 to 60% by volume and 5 to 55% by volume based on the composition. A molded article made of such a composition is low in friction coefficient and high in mechanical strength. When this composition is incorporated with a synthetic resin having a higher hardness than the olefinic resin, the resultant molded article is enhanced in endurance on sliding. The resulting composition is suitable for manufacturing of a sliding member such as a tape guide.

10 Claims, 2 Drawing Sheets

OLEFINIC RESIN COMPOSITION AND MOLDED ARTICLE

BACKGROUND OF THE INVENTION

The present invention relates to an olefinic resin composition and a molded article therewith. More particularly, it relates to an olefinic resin composition for molding an article therewith. The molded article is characteristic in having a low friction coefficient and a high mechanical strength and therefore useful, for instance, as a sliding member.

The term "sliding member" as used in the present specification is intended to mean a shaped body having a sliding property at the surface so that it can readily move along the surface of another member or vice versa.

In recent years, sliding members are often manufactured with synthetic resins, particularly olefinic resins, for the miniaturization and lightening of devices as well as reduction of costs. Unfortunately, however, olefinic resins do not have the necessary high lubricity demanded for sliding members, though their friction coefficient is relatively low. Further, they are elastic and not rigid enough and, their deflection temperature under load is low and their mechanical strength is not sufficient.

In order to overcome the above defects experienced with the use of olefinic resins, attempts have been made to reinforce them by incorporation of various inorganic materials therein. Examples of such inorganic materials are granular particles (e.g. calcium carbonate powder, metal powder, silica powder), fibrous materials (e.g. glass fibers), and the like. Such attempts have been successful in improving the mechanical strength but not effective for decreasing the friction coefficient. In addition, incorporation of granular particles, fibrous materials, etc., results in formation of protrusions or projections at the surfaces of the sliding members as molded, and the corresponding members when slidingly contacted therewith are scratched by the protrusions or projections whereby the sliding property is further deteriorated.

SUMMARY OF THE INVENTION

For the purpose of decreasing the friction coefficient of an olefinic resin adequately to enhance the sliding property while improving the mechanical strength, an extensive study has been made, and as a result, it has now been found that the incorporation of an inorganic material in the form of specific particles in rod shape (rod-shaped particles) and specific particles of planar crystalline structure (planar crystalline particles) can achieve such a purpose. It has also been found that the incorporation of a synthetic resin into a composition comprising an olefinic resin and an inorganic material, the synthetic resin having a higher hardness than the olefinic resin, is effective in increasing the hardness of the surface of a molded article manufactured from the resulting composition, whereby the molded article is much improved in endurance to the sliding movement. This invention is based on the above findings.

DETAILED DISCUSSION

The olefinic resin composition of the present invention comprises an olefinic resin, and inorganic rod-shaped particles and planar crystalline particles. A molded article such as a sliding member (e.g. gear, guide) made of such a composition has a sufficiently low friction coefficient and high mechanical strength to function as a sliding member showing an excellent sliding property. When, for instance, the sliding member is shaped as a tape guide and the tape guide is incorporated into a cartridge, such as an ink ribbon cartridge for a word processor or a magnetic tape cartridge for a magnetic recording apparatus, the ink ribbon or magnetic tape in the respective cartridge shows good running property.

The olefinic resin composition may include additionally a synthetic resin having a higher hardness than the olefinic resin therein. In this case, the hardness of a molded article at the surface, as manufactured from the resulting composition, is excellent so that such a molded article is hardly scratched. When a sliding member is made of such a composition, it shows high endurance to the sliding movement.

The reason for which the above technical effects are obtained according to this invention may be presumed as set forth below. When a molded article manufactured from the composition of the present invention receives a mechanical force at the surface, the mechanical force would contribute to the relative motion between the rod-shape particles and the planar crystalline particles so that the rod-shape particles are positioned between the planar crystalline particles, whereby the planar crystalline particles work like wheels at the bearing surface while the rod-shape particles work like rollers. Consequently, with these particles at the surface of the molded article the contacting surfaces can easily move slidingly so that the friction coefficient is sufficiently decreased, the sliding property being thus enhanced.

Since the dispersibility of the rod-shape particles and the planar crystalline particles in the olefinic resin is quite good, unlike conventional inorganic particles, the olefinic resin can be well reinforced. Also, the rod-shape particles and the planar crystalline particles are readily oriented in a uniform direction and in parallel to the sliding surface of the molded article so that the friction coefficient is efficiently decreased and the reinforcing effect is sufficiently exerted for enhancing the mechanical strength.

BRIEF DISCUSSION OF DRAWINGS

Figure 1:
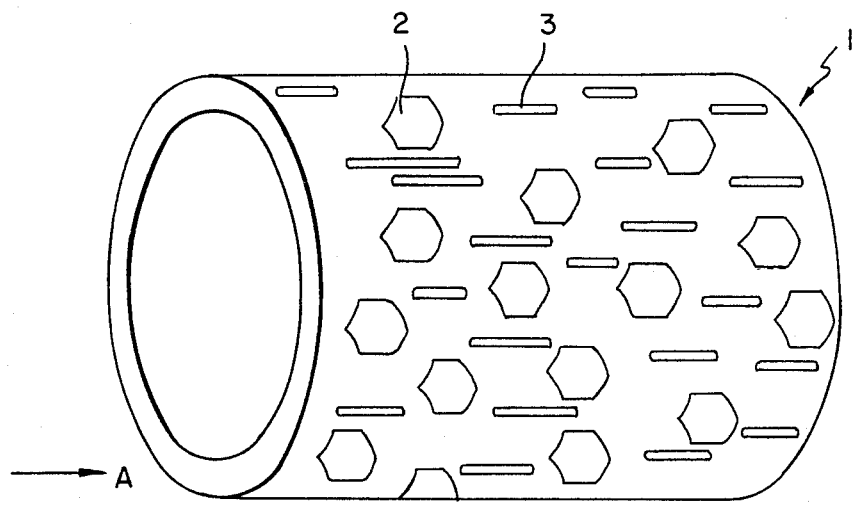
FIGS. 1 and 2 are perspective views of a cylindrical guide member made from the resin composition of the present invention.
Figure 2:
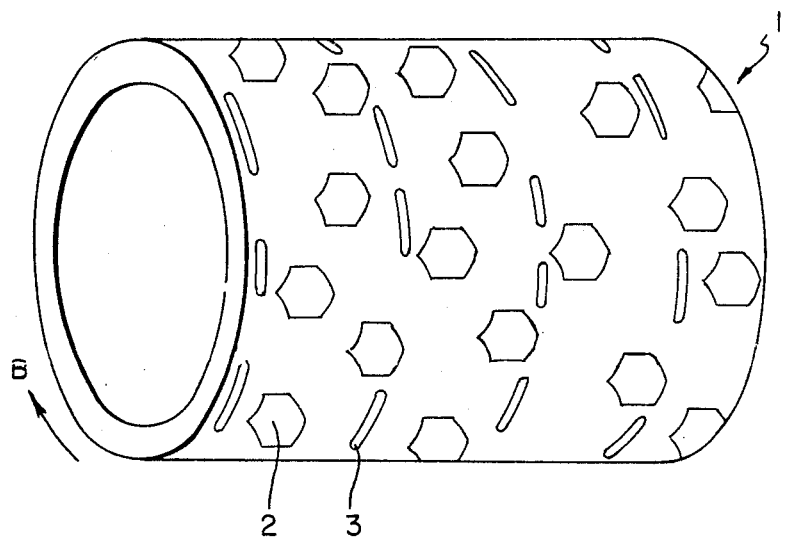
Figure 3:
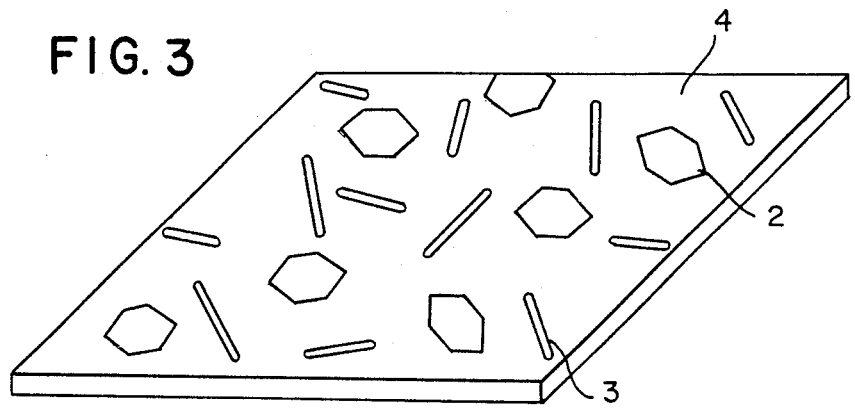
FIG. 3 is a perspective view of a plate shaped guide member made from the resin composition of the present invention.

For the manufacturing of a guide member in a cylindrical shape, reference may be made to FIG. 1 of the accompanying illustrations showing a perspective view of such a guide member. Namely, the olefinic resin composition of the invention in a melt state is pressed into a die from the direction of the arrow line A so that the rod-shape particles 3, present between the planar crystalline particles 2 at the surface of the guide member 1, are arranged in an axial direction of the guide member 1, whereby the friction coefficient of such a guide member on sliding contact with a member running at a right angle to this axial direction is significantly decreased and also a remarkable reinforcement is achieved so that the mechanical strength is substantially increased. On manufacture of the guide member 1 as shown in FIG. 2, the olefinic resin composition in a melt state is pressed into a die from the direction of the arrow line B, whereby the rod-shape particles 3, present between the planar crystalline particles 2 at the surface of the guide member 1, are arranged in a circumferential direction, so that the friction coefficient on the sliding contact with a member running in parallel to the axial direction of the guide member 1 is significantly decreased and, simultaneously, an excellent reinforcing effect is exerted to show a high mechanical strength. In the same manner as above, a guide member 4 in a plate shape, as shown in FIG. 3, may be molded.

The molded article manufactured with the composition of the present invention is, as stated above, well improved in sliding property and mechanical strength. When the composition contains a synthetic resin having a higher hardness than the olefinic resin, the hardness of the molded article at the surface is especially remarkable so that its endurance is excellent. Therefore, the molded article may be shaped as a sliding member such as a gear, a wheel or a tape guide.

As the olefinic resin as the major component in the composition of the present invention, there may be used polyethylene, polypropylene, polybutylene, etc. Their copolymers such as ethylene/propylene copolymer are also usable. Among them, polyethylene having a Rockwell hardness number of not less than 30 (R scale) and a ultra-high molecular weight of 500,000 to 1,000,000 is the most suitable for obtaining a molded article having sufficiently low friction coefficient, satisfactory rigidness and high heat resistance.

As the rod-shape particles, fibrous or whisker inorganic materials such as glass fibers, boron fibers, silicon carbide fibers, potassium titanate whisker, silicon nitride whisker, alumina whisker and graphite whisker are usable. Among them, potassium titanate whisker is the most favorable in having good friction characteristics and low hardness and being capable of producing a sufficient reinforcement.

The planar crystalline particles may be chosen from graphite, molybdenum disulfide, mica, boron nitride, hexagonal planar barium ferrite, and the like. Among them, graphite particles are particularly preferred, because they can be easily orientated in parallel to the sliding surface of the ultimate molded article and in a uniform direction and ensure a distinguished reinforcement.

In the composition of the invention, the content of the olefinic resin may be within a range of 10 to 90 % by volume based on the volume of the composition, for exertion of a good sliding property, as well as realization of a favorable molding property. The rod-shape particles may be contained in an amount of from 3 to 60 % by volume to the volume of the composition, whereby friction characteristics, as well as mechanical strength are sufficiently improved and high impact strength, is assured. The amount of the planar crystalline particles may be within a range of 5 to 55 % by volume to the volume of the composition for assurance of sufficient reinforcement, good size stability and high heat resistance and also for sufficient decrease of the friction coefficient.

The volume of the planar crystalline particles is preferred to be not more than 4 times that of the rod-shape particles, and the long axis of the rod-shape particles is favorable to be not more than 20 times the particle size of the planar crystalline particles. When any of these limitations is not kept, the interaction between the rod-shape particles and the planar crystalline particles may not be sufficiently exerted at the sliding surface so that the desired technical effect is not achieved. The long axis/short axis ratio of the rod-shape particles is usually within a range of 5 to 50 um, and the particle size of the planar crystalline particles is normally within a range of 0.1 to 30 $\mu$m.

When an olefinic resin and a synthetic resin having a higher hardness than the olefinic resin are used in combination, the olefinic resin is ordinarily used in an amount of not less than 30 % by volume based on the volume of the composition for exertion of the sliding property inherent to the olefinic resin and realization of a constant molding property and also for enhancement of endurance. In order to assure the effect of the synthetic resin, the volume proportion of the olefinic resin and the synthetic resin may be within a range of 1 : 1 to 7 : 1. In the case where the olefinic resin is used in a higher proportion, the desired effect of the synthetic resin is not produced. In the case where the olefinic resin is employed in a lower proportion, the effect on the friction characteristics is decreased, and the endurance to abrasion becomes inferior.

As the synthetic resin, the use of one having a Rockwell hardness of not less than 50 (Scale M) is preferred. In general, higher hardness is better. Specific examples of the synthetic resin are ester resins such as polycarbonates, polyarylates, polyesters, and the like.

As the inorganic material, there are preferably used rod-shape particles and planar crystalline particles as explained above. The content of the inorganic material may be from 5 to 50 % by volume based on the volume of the composition for assuring the reinforcing effect so as to exert sufficient size stability and heat resistance.

For manufacture of a molded article with the composition of the invention, there may be adopted any per se conventional molding procedure such as injection molding, compression molding and extrusion molding, among which injection molding is preferred in making the rod-shape particles and the planar crystalline particles sufficiently oriented.

Figure 4:
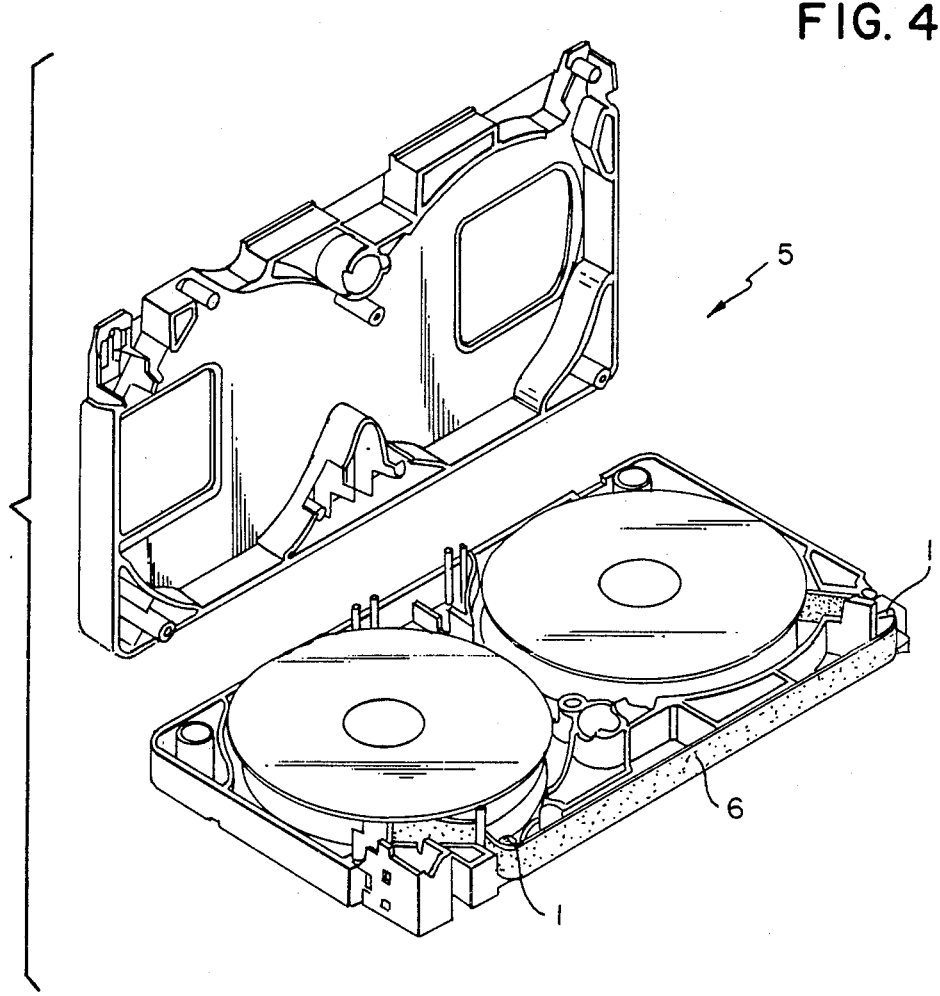
FIG. 4 is a perspective view of a disassembled tape cartridge.

The thus manufactured molded article has excellent sliding property and mechanical strength and is useful as a sliding member (e.g. gear, guide, roller), especially a tape guide. Such tape guide may be incorporated, for instance, into an ink ribbon cartridge for a word processor so that the ink ribbon therein can show good running property. Further, for instance, the tape guide may be incorporated into a magnetic tape cartridge for a tape recording apparatus so that the magnetic tape therein shows good running property (FIG. 4 shows a perspective view of a magnetic tape cartridge 5 in a disassembled state, wherein 1 is a tape guide made from the composition of the present invention, and 6 is a magnetic tape. When the sliding member is shaped as a tape guide, it is particularly favorable to include the synthetic resin as stated above, because such a tape guide is hardly scratched by any other member slidingly in contact therewith and rarely sustains damage to the surface thereof so that a high durability can be assured.

PREFERRED EMBODIMENTS

Practical embodiments of the invention are illustratively shown in the following examples, wherein % is by volume unless otherwise indicated.

EXAMPLE 1

| Component | (%) |
| --- | --- |
| Ultra-high molecular weight polyethylene resin (molecular weight, 1,000,000) | 70 |
| Potassium titanate whisker (length, 10 μm; particle size, 0.5 μm; specific gravity, 3.3) | 10 |
| Artificial graphite powder (particle size, 0.7 μm; specific gravity, 2.2) | 20 |

The above components were fused at 270° C., mixed together and extruded to make pellets, which were injectionmolded to make a test plate 4 as shown in FIG. 3 of the accompanying drawing.

Separately, the fused mixture was pressed into a die of 80° C. for injection molding from the direction of an arrow line A in FIG. 1 of the accompanying drawing to make a thin layer cylindrical tape guide 1 having a thickness of 0.6 mm and an outer diameter of 6 mm. The tape guide was incorporated in a magnetic tape cartridge 5 as shown in FIG. 4 of the accompanying drawing.

EXAMPLE 2

In the same manner as in Example 1 but using ultra-high molecular weight polyethylene resin (90 %), potassium titanate whisker (5 %) and artificial graphite powder (5 %), a test plate and also a thin layer cylindrical tape guide and a magnetic tape cartridge 5 incorporated therewith were prepared.

EXAMPLE 3

| Component | (%) |
| --- | --- |
| Ultra-high molecular weight polyethylene resin (molecular weight, 500,000; Rockwell hardness, 60 (R scale)) | 60 |
| Polycarbonate resin (Rockwell hardness, 70 (M scale)) | 10 |
| Potassium titanate whisker (length, 10 μm; particle size, 0.5 μm; specific gravity, 3.3) | 10 |
| Artificial graphite powder (particle size, 0.7 μm; specific gravity, 2.2) | 20 |

The above components were mixed well by the aid of a mixer and fused at 300° C., kneaded and granulated by the use of an extruder. The granules thus obtained were injection-molded to make a test plate 4 as shown in FIG. 3 of the accompanying drawing.

Separately, the fused mixture was pressed into a die of 80° C. for injection molding from the direction of an arrow line A in FIG. 1 of the accompanying drawing to make a thin layer cylindrical tape guide 1 having a thickness of 0.6 mm and an outer diameter of 6 mm. The tape guide was incorporated in a magnetic tape cartridge 5 as shown in FIG. 4 of the accompanying drawing.

EXAMPLE 4

In the same manner as in Example 3 but using polyarylate resin (Rockwell hardness, 90 (M scale)) (10 %) instead of polycarbonate resin, a test plate and also a thin layer cylindrical tape guide and a magnetic tape cartridge 5 incorporated therewith were prepared.

EXAMPLE 5

In the same manner as in Example 3 but using polycarbonate resin (25 %) and artificial graphite powder (15 %) and omitting potassium titanate whisker, a test plate and also a thin layer cylindrical tape guide and a magnetic tape cartridge 5 incorporated therewith were prepared.

EXAMPLE 6

In the same manner as in Example 3 but using molecular weight polyethylene resin (65 %) and polycarbonate resin (5 %), a test plate and also a thin layer cylindrical tape guide and a magnetic tape cartridge 5 incorporated therewith were prepared.

EXAMPLE 7

In the same manner as in Example 3 but using ultra-high molecular weight polyethylene resin (30 %) and polycarbonate resin (40 %), a test plate and also a thin layer cylindrical tape guide and a magnetic tape cartridge 5 incorporated therewith were prepared.

COMPARATIVE EXAMPLE 1

In the same manner as in Example 1 but using ultra-high molecular weight polyethylene resin (75 %) and potassium titanate whisker (25 %) and omitting artificial graphite powder, a test plate and also a thin layer cylindrical tape guide and a magnetic tape cartridge incorporated therewith were prepared.

COMPARATIVE EXAMPLE 2

In the same manner as in Example 1 but using ultra-high molecular weight polyethylene resin (75 %) and artificial graphite powder (25 %) and omitting potassium titanate whisker, a test plate and also a thin layer cylindrical tape guide and a magnetic tape cartridge incorporated therewith were prepared.

COMPARATIVE EXAMPLE 3

In the same manner as in Example 1 but using polyamide resin ("Nylon 12") (70 %) instead of ultra-high molecular weight polyethylene resin, a test plate and also a thin layer cylindrical tape guide and a magnetic tape cartridge incorporated therewith were prepared.

COMPARATIVE EXAMPLE 4

In the same manner as in Example 1 but using fluoro resin powder (10 %) instead of potassium titanate whisker, a test plate and also a thin layer cylindrical tape guide and a magnetic tape cartridge incorporated therewith were prepared.

COMPARATIVE EXAMPLE 5

In the same manner as in Example 1 but using silica powder (10 %) instead of potassium titanate whisker, a test plate and also a thin layer cylindrical tape guide and a magnetic tape cartridge incorporated therewith were prepared.

The test plates obtained in Examples 1 and 2 and Comparative Examples 1 to 5 were subjected to evaluation of deflection temperature under load and impact strength in the manner as set forth below.

Deflection temperature under load:

The deflection temperature under a load of 4.6 kg/cm² was measured according to JIS (Japanese Industrial Standard) K7207. Impact strength:

The notched izod impact strength was measured according to JIS K7110.

The results are shown in Table 1, wherein the friction coefficient as determined in the following manner is also shown.

Apart from the test plates as mentioned above, hemispherical test pieces were prepared using the fused mixtures in Examples 1 and 2 and Comparative Examples 1 to 5. The test piece (apex sphere, R 4) was spot-contacted on a SUS304 mirror plate (average roughness on 10 spots according to JIS B0601, Rz 0.2 μm), and a weight of 100 g was charged on the test piece and fixed to a gauge tensiometer set in a sliding direction. The SUS304 mirror plate was slided at a speed of 1000 mm/min with a reciprocating stroke of 10 cm, and the tension (T) charged on the test piece was measured. The friction coefficient was calculated according to the following equation: $\mu = T\ (g)/100\ (g)$.

TABLE 1

| Example | Deflection temperature under load (°C.) | Impact strength (kg · cm/cm) | Friction coefficient |
|---|---|---|---|
| 1 | 116 | 9 | 0.11 |
| 2 | 110 | 10 | 0.13 |
| Comparative Example | | | |
| 1 | 110 | 5 | 0.22 |
| 2 | 104 | 6 | 0.25 |
| 3 | 162 | 4 | 0.23 |
| 4 | 99 | 6 | 0.25 |
| 5 | 105 | 4 | 0.27 |

The test plates obtained in Examples 1 and 3 to 7 were subjected to evaluation on Rockwell hardness (JIS K7202), flexural modulus (JIS K7203) and heat deformation temperature (JIS K7202; load, 4.6 kgf)). The results are shown in Table 2.

TABLE 2

| Example | Rockwell hardness (R) | Flexural modulus (kg/cm²) | Heat deformation temperature (°C.) |
|---|---|---|---|
| 1 | 35 | 35,000 | 110 |
| 3 | 60 | 51,000 | 120 |
| 4 | 70 | 60,000 | 120 |
| 5 | 50 | 48,000 | 115 |
| 6 | 40 | 41,000 | 112 |
| 7 | 78 | 58,000 | 119 |

Further, the friction coefficients of the tape guides as prepared in Examples 1 and 2 and Comparative Examples 1 to 5 against a magnetic recording tape using a polyester film as the base layer were measured in the following manner: the tape was contacted around the tape guide at an angle of 90° in a manner that the base layer is in direct contact with the tape guide; a weight of 30 kg was suspended on one end of the tape, while the other end was fixed to a gauge tensiometer; the tape was slidably moved at a speed of 1000 mm/min with a reciprocating stroke of 10 cm, and the tension charged on the tape was measured; and the friction coefficience was calculated according to the Euler's equation.

Then, the tape guides 1 were each incorporated into a video tape cartridge 5 as shown in FIG. 4, and the dropout and the damage on a magnetic recording tape (the base layer) were examined. Evaluation of the dropout was made on the following criteria: O, no change in dropout number; X, increase in dropout number. Evaluation of the damage on a magnetic recording tape was made in the following criteria: O, no damage affording an influence on the magnetic layer; X, presence of damage affording an influence on the magnetic layer.

The results are shown in Table 3.

TABLE 3

| | Friction coefficient | Dropout | Damage on base layer |
|---|---|---|---|
| Example | | | |
| 1 | 0.18 | O | O |
| 2 | 0.19 | O | O |
| Comparative Example | | | |
| 1 | 0.25 | X | X |
| 2 | 0.26 | X | X |
| 3 | (base layer adhered to tape guide) | X | X |
| 4 | 0.30 | X | X |
| 5 | 0.27 | X | X |

In the same manner as above, the friction coefficients were measured on the tape guides as obtained in Examples 1 and 3 to 7. Further, the tape guide 1 was incorporated into a video tape cartridge 5 as shown in FIG. 4, and the cartridge was subjected to repeated operation for reproducing and rewinding by the use of a standard video deck repeated, and the number of operation (sliding frequency) until production of damage on the tape guide and the video tape was measured. Also, the increase of the dropout caused by damage was measured by a dropout counter, and the number of operation (sliding frequency) until increase of the dropout was examined. The results are shown in Table 4.

TABLE 4

| Example | Friction coefficient | Sliding frequency (time) | | |
|---|---|---|---|---|
| | | Until production of damage on the tape guide | Until production of damage on the video tape | Until increase of dropout |
| 1 | 0.18 | 20 | 20 | 20 |
| 3 | 0.18 | 100 | 100 | 100 |
| 4 | 0.18 | 100 | 100 | 100 |
| 5 | 0.18 | 100 | 100 | 100 |
| 6 | 0.18 | 50 | 50 | 50 |
| 7 | 0.21 | 50 | 50 | 50 |

As understood from Table 1, the test plates of Examples 1 and 2 show high deflection temperature under load and mechanical strength with good balance in comparison with those of Comparative Examples 1 to 5 and are lower in friction coefficient than the latter. It is thus apparent that the olefinic resin composition of the invention is excellent in molding property and size stability, and the molded article resulting therefrom shows high mechanical strength and low friction coefficient.

Also, Table 2 shows that the test plates of Examples 3 to 7 have higher Rockwell hardness, flexural modulus and heat deformation temperature than that of Example 1. It is thus apparent that the olefinic resin compositions of Examples 3 to 7 according to the invention are more excellent in molding property and size stability than that of Example 1, and the molded articles resulting from them are of significantly high quality as sliding members.

Further, Table 3 shows that the tape guides as obtained in Examples 1 and 2 are smaller in friction coefficient and less in dropout variation than those as obtained in Comparative Examples 1 to 5. In addition, they do not afford such a serious damage on the base layer as influencing onto the magnetic layer. It is thus apparent that the tape guide of the invention is sufficiently small in friction coefficient, excellent in slidability and high in mechanical strength, and a magnetic tape cartridge incorporated therewith gives a highly improved running property to a magnetic recording tape.

Moreover, Table 4 shows that the tape guides as obtained in Examples 3 to 7 are hardly damaged and also hardly afford damages onto video tapes in comparison with that as obtained in Example 1. In addition, the increase of dropout is more hardly caused by the former in comparison with the latter. Accordingly, it may be said that the tape guide manufactured from an olefinic resin composition comprising a synthetic resin having a higher hardness than the olefinic resin itself within a certain range of proportion is sufficiently small in friction coefficient and more excellent in durability on sliding.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A molding composition which comprises an olefinic resin, a synthetic ester resin having a hardness value greater than the hardness value of the olefinic resin and an inorganic material including particles of a planar crystalline structure within a range of of 5 to 55% by volume to the volume of the composition and particles of a rod shaped structure in an amount of from 3 to 60% by volume to the volume of the composition. said olefinic resin component being present in an amount of not less than 30% by volume based on the compositions;

2. The composition according to claim 1, wherein said olefinic resin is polyethylene.

3. The composition according to claim 1, wherein said particles of planar crystalline structure are graphite particles.

4. The composition of claim 1, wherein said ester resin is selected from at least one member of the group consisting of polycarbonate, polyarylates and polyesters.

5. A molded article comprising a composition including an olefinic resin, a synthetic ester resin having a hardness value greater than the hardness value of the olefinic resin and an inorganic material including particles of a planar crystalline structure within a range of 5 to 55% by volume to the volume of the composition and particles of a rod shaped structure in an amount of from 3 to 60% by volume to the volume of the composition, said olefinic resin component being present in an amount of not less than 30% by volume based on the composition;

6. The composition according to claim 1, wherein the volume proportion of said olefinic resin to said synthetic ester resin is from 1:1 to 7:1, said olefinic resin is polyethylene, said synthetic of polycarbonate, polyarylates and polyesters and said inorganic planar crystalline particles are graphite particles.

7. The composition according to claim 1, wherein said olefinic resin is present in an amount of not less than 30% by volume based on the composition.

8. The composition according to claim 1, wherein the volume proportion of said olefinic resin to said synethic ester resin is from 1:1 to 7:1 , said olefinic resin is polyethylene, said synthetic ester resin is selected from at least one member of the group consisting of polycarbonates, polycarbonates, polyarylates and polyesters and said inorganic planar crystalline particles are graphite.

9. The composition according to claim 1 wherein the volume proportion of the olefinic resin and the synthetic resin is from 1:1 to 7:1.

10. The molded article according to claim 5, wherein the volume proportion of the olefinic resin and the synthetic resin is from 1:1 to 7:1.

* * * * *